Patented Dec. 4, 1945

2,390,138

UNITED STATES PATENT OFFICE 2,390,138

METHOD OF CONDITIONING GEL MOLDS

Vance V. Vallandigham, Park Ridge, Ill., assignor to Coe Laboratories, Inc., Chicago, Ill., a corporation of Illinois No Drawing. Application June 28, 1943, Serial No. 492,586

6 Claims. (Cl. 18—55.1)

The present invention relates to the art of taking impressions to form molds in which to produce models, and it has special reference to dental impressions, molds and models.

Although the invention is not limited to the dental field, such field imposes exacting requirements in the art, and therefore, the invention will be explained particularly by reference to the dental field.

For example, it is customary in dentistry to take an impression of a patient's jaw, with or without teeth, in order to obtain a mold, and then to make a "stone" cast. Various mold materials and various compositions for "stone" are used. One of the important objectives is accuracy in dimensions from jaw to cast, and another is a suitable hard surface on the cast.

The "stone" forming compositions are usually hydraulic-setting mineral, or mineral mixtures. Plaster of Paris is one which is commonly used. Other minerals in the nature of common hydraulic cement are employed.

The mold materials in common use are materials or compositions, which may be mixed ultimately into aqueous liquid form, as a paste or viscous fluid which sets quickly by a gelling action induced by the composition employed. Thus, a mold is formed which is firm while being tough and elastic by reason of a gel therein. The mold as formed contains water and it is subject to undesirable change in dimensions due to evaporation or diffusion of water from the gel. The technician usually places the freshly gelled mold in a water bath to aid in maintaining its dimensional form while he is preparing the stone-forming mixture, or until he prepares it, for example on a following day. Too long a time in the bath also may alter the mold, by reason of diffusion of soluble chemical from it, or by a softening of the gel, or by a reversion of the gel to a sol form. Not merely loss of water leads to change in dimension, but also gain in water. Differences in osmotic pressure between the mold and the bath lead to change in water content tending to create equality of osmotic pressure. The gel itself acts as a semi-permeable membrane. Therefore, another desirable requirement for the bath is an osmotic pressure substantially equal to that within the mold. This is readily achieved by control of the concentration of dissolved material in the bath, and the control is indicated by the particular composition of the impression mix at hand to be treated.

When the surface of the mold is altered, as by the action of a water bath, the stone cast presents defects. It may have a chalky surface, which is very much undesired. It may be irregular and inaccurate as to desired dimensions. This alteration of the mold surface also can occur by action of time while a slow-setting stone composition is being formed into a cast, this alteration being reflected in the cast. Chemicals in the mold, which are adverse to good properties in the cast, may diffuse to the cast material from the mold, and also alter the cast.

Heretofore it has been proposed to add potassium sulfate to the water bath which receives the fresh mold, in order that a slight absorption of potassium sulfate by the surface of the mold will cause the absorbed amount to act as a stone-setting accelerator. However, it has been found that the gels of the mold are softened by exposure to such a bath, when potassium sulfate alone is present for providing stone-setting accelerator, and, as a result, the cast is dimensionally changed and not satisfactory.

It is an object of the present invention to provide a method whereby freshly gelled molds may be placed in a bath, in which bath the mold may be held for a long time without dimensional change or damage to the mold.

It is also an object of the present invention to provide a method whereby a bath acts upon the mold to toughen its surface, while retaining its elasticity, so that it resists action tending to damage it, as in handling the mold.

It is also an object of the invention to provide a method whereby a bath charges the mold with stone-setting accelerator while toughening and hardening the mold, in which bath the mold may be held for a long time without dimensional change or damage to the mold.

Various other and ancillary objects and advantages of the invention will become apparent from the following description and explanation of the invention.

There are many accelerators for setting hydraulic cements, including plaster of Paris, and these are well known to the art. Some are better for one type of stone than for another. Suitable ones may be chosen from the following list:

Sodium thiosulphate
Potassium bromide
Potassium nitrate
Potassium chloride
Potassium sulfate
Sodium sulfate
Sodium nitrate Sodium bromide
Sodium chloride
Magnesium sulfate
Alum
Zinc sulfate
Calcium hydroxide There are numerous soluble agents which act as gel-precipitants for the gellable content, such as soluble alginate salts. Commonly, these are not ingredients of impression mixtures because they lead to rapid gelling. For example, sodium alginate is gelled by calcium ions, but a salt such as calcium chloride is not used per se as an ingredient in impression mixtures for the reason that it will induce gelling before the mixture can be used. So a slightly soluble calcium compound is used in the mixture, such as calcium sulfate. However, after the mold is gelled, and while it contains incompletely gelled content, water-soluble gel-precipitants such as calcium chloride may be brought into contact with the gel. Suitable ones for alginate salts are:

Zinc sulfate
Calcium chloride
Calcium hydroxide
Iron sulfate
Chrome alum
Alum
Aluminum chloride
Barium salts and hydroxide
Strontium salts and hydroxide Some of these are also included above in the list of setting accelerators. Thus, there are single agents suitable for a fixing bath which perform two functions, one on the mold, and one on the cast. Use of such single agents for a bath is contemplated in the present invention.

Various gel-forming materials are used in mold-forming mixes, and suitable ones are water-soluble alginates, water-soluble algin, water-soluble pectates, and water-soluble pectins. Examples of impression materials using such gel-forming ingredients may be found in Sidney William Wilding Patent No. 2,249,694 and in applicant's copending applications, Serial No. 428,103, filed January 24, 1942, Serial No. 403,363, filed July 21, 1941, Serial No. 443,017, filed May 14, 1942, Serial No. 454,731, filed August 13, 1942, and Serial No. 476,213, filed February 17, 1943.

By reason of reaction within the aqueous mixture containing these gel-formers, a gel forms, which gel is chemically or physically reactive under suitable conditions. Reversion of it to a soluble form sometimes occurs, which is evidenced by dimensional change and softening of the mold. Therefore, when a stone-setting accelerator is dissolved in a bath, it must be one which does not induce softening of the gel in the mold. In order to illustrate this, a mold-forming mixture containing sodium or potassium alginate and calcium sulfate is taken as an example. The calcium sulfate slowly provides sufficient calcium ions to form a gel of calcium alginate. Upon placing such a gelled mold into water containing potassium sulfate for example, on long standing the calcium alginate to a degree reverts to potassium alginate especially at the surface, whereby the mold itself is changed in dimension and softened. Use of this softened mold results in inaccurate reproduction of surface in the cast.

With respect to such example, the present invention may be applied to add to the bath an agent which toughens and hardens the gel, and which prevents attack upon the mold by potassium sulfate or some of the other stone-setting accelerators which are not gel-precipitants. For example, a small percentage of zinc sulfate dissolved in the bath acts upon any soluble or slightly soluble alginate salt to form zinc alginate. The zinc ions react to form a tough flexible skin or coating over the entire surface of the mold by reacting with the residual ungelled alginate, algin, pectate or pectin on the surface of the mold.

In theory, an impression mixture having, for example, sodium alginate and calcium sulfate to precipitate calcium alginate, should form entirely calcium alginate. In practice, however, the gelling is effected while ungelled soluble alginate remains, and the conversion of the latter to calcium alginate proceeds slowly in the gelled mold. Accordingly, freshly made gels, as they are ready from the making, and ready for immersion in a bath, contain an appreciable residue of gellable alginate or other gel-former, in a soluble or slightly soluble form. The small percentage of zinc sulfate dissolved in the bath acts upon this substantially soluble material to form the hard skin of zinc alginate or other gel on the surface and the same material inwardly, as the zinc sulfate penetrates.

In practice, potassium sulfate $K_2SO_4$ may be mixed with zinc sulfate $ZnSO_4$ in about the proportions of approximately 4% of zinc sulphate to approximately 96% of potassium sulphate. This provides a dry powder which may be put up and distributed in pill form. The fixing bath is produced by preparing a 2% solution of this powder and water, i. e., approximately 2% of the powder to approximately 98% water, which gives a suitable osmotic pressure for alkali-metal alginate mixtures containing calcium sulfate as gel-precipitant. This concentration, of course, may vary widely within the scope of the present invention.

I contemplate within the scope of the broader aspects of the present invention using, instead of zinc sulphate, any soluble salt of a gel-precipitant which will also accelerate the setting of the stone. Calcium sulfate, $CaSO_4$, aluminum sulfate, $Al_2(SO_4)_3$, aluminum chloride, $AlCl_3$, and the like properly adjusted in respect of water are examples.

Four parts of sodium sulfate ($Na_2SO_4$) plus 96 parts of zinc sulfate ($ZnSO_4$), using a 2% solution of the mixture, have been found to hold the mold material to the smallest dimensional change of any of the combinations of which I am now aware.

The following examples illustrate agents or compositions for the present invention, all of which are suitable in a 2% solution (by weight) for alginate impression mixtures. Parts are by weight:

Example 1

| | Parts |
|---|---|
| Anhydrous zinc sulfate | 4 |
| Anhydrous potassium sulfate | 96 |

Example 2

| | Parts |
|---|---|
| Anhydrous aluminum sulfate | 3 |
| Potassium nitrate | 97 |

Example 3

| | Parts |
|---|---|
| Anhydrous sodium chromium sulfate | 6 |
| Anhydrous sodium sulfate | 94 |

Example 4

Alum

Example 5

Zinc sulfate

From the foregoing, it will be appreciated that a bath is made having an osmotic pressure close to that of the particular gelled mold to be placed in the bath, the bath having a composition of one or more soluble agents, which composition preferably provides setting accelerator for a stone cast, and essentially provides a gel-precipitant substance to act quickly upon ungelled gel-forming material in the mold, while simultaneously repressing any tendency of already gelled content of the mold to revert to soluble form.

That numerous compositions other than those illustrated may be employed in the process disclosed will become apparent to those skilled in the art, after an understanding of the foregoing description and explanation, and such variations are contemplated as falling within the scope of the invention as set forth in the appended claims.

I claim:

1. The method of conditioning gel molds for receipt of hydraulic setting-mineral casting material, which comprises forming a mold by a setting action involving the gelation of water-soluble colloid material selected from the group consisting of water-soluble alginate salts, water-soluble algin, water-soluble pectate salts and pectin, placing the gelled mold in an aqueous bath containing in solution a small quantity of dissolved material including water-soluble accelerator for said setting-mineral material and including a second material which is water-soluble gel-precipitant for the water-soluble colloid material, whereby the accelerator enters the mold to be retained thereby for delivery therefrom in forming the cast to be made, and whereby the gel-pricipitant toughens and hardens the mold surface, removing the mold from the bath, and placing a hydraulic-setting mineral mix against the mold surface to form a cast, whereby accelerator in the mold speeds the setting of the cast, the quick-setting of the cast and the toughening and hardening of the mold providing a hard, smooth molded surface on the cast.

2. The method of conditioning gel molds for receipt of hydraulic setting-mineral casting material, which comprises forming a mold by a setting action involving the gelation of an aqueous mixture containing a water-soluble alginate salt and a gel-precipitant therefor, placing the gelled mold in an aqueous bath containing in solution a small quantity of dissolved material including water-soluble accelerator for said setting-mineral material and including a second material which is water-soluble gel-precipitant for the water-soluble alginate salt, whereby the accelerator enters the mold to be retained thereby for delivery therefrom in forming the cast to be made, and whereby the gel-precipitant toughens and hardens the mold surface, removing the mold from the bath, and placing a hydraulic-setting mineral mix against the mold surface to form a cast, whereby accelerator in the mold speeds the setting of the cast, the quick-setting of the cast and the toughening and hardening of the mold providing a hard, smooth molded surface on the cast.

3. The method of conditioning gel molds for receipt of hydraulic setting-mineral casting material, which comprises forming a mold by a setting action involving the gelation of an aqueous mixture containing a water-soluble alginate salt and a gel-precipitant therefor, placing the gelled mold in an aqueous bath containing in solution a small amount of dissolved material including a water-soluble accelerator for said setting-mineral composition and including zinc sulfate, whereby the accelerator enters the mold to be retained thereby for delivery therefrom in forming the cast to be made, and whereby the zinc sulfate toughens and hardens the mold surface, removing the mold from the bath, and placing a hydraulic-setting mineral mix against the mold surface to form a cast, whereby accelerator in the mold speeds the setting of the cast, the quick setting of the cast and the toughening and hardening of the mold surface by the zinc sulfate providing a hard smooth molded surface on the cast.

4. The method of conditioning gel molds for receipt of hydraulic setting-mineral casting material, which comprises forming a mold by a setting action involving the gelation of an aqueous mixture containing a water-soluble alginate salt and a gel-precipitant therefor, placing the gelled mold in an aqueous bath containing in solution a small quantity of a substance which functions both as an accelerator for said setting mineral composition and as a gel-precipitant for said soluble alginate salt, whereby said substance enters the mold in part to toughen and harden the surface thereof and in part to remain therein for delivery therefrom in forming the cast to be made, removing the mold from the bath, and placing a hydraulic-setting mineral mix against the mold surface to form the cast.

5. The method of conditioning gel molds for receipt of hydraulic setting-mineral casting material, which comprises forming a mold by a setting action involving the gelation of water-soluble colloid material selected from the group consisting of water-soluble alginate salts, water-soluble algin, water-soluble pectate salts and pectin, placing the gelled mold in an aqueous bath containing in solution a small quantity of dissolved material providing water-soluble accelerator for said setting-mineral material and water-soluble gel-precipitant for the water-soluble colloid material, whereby the accelerator enters the mold to be retained thereby for delivery therefrom in forming the cast to be made, and whereby the gel-precipitant toughens and hardens the mold surface, removing the mold from the bath, and placing a hydraulic-setting mineral mix against the mold surface to form a cast, whereby accelerator in the mold speeds the setting of the cast, the quick-setting of the cast and the toughening and hardening of the mold providing a hard, smooth molded surface on the cast.

6. The method of conditioning gel molds for receipt of hydraulic setting-mineral casting material, which comprises forming a mold by a setting action involving the gelation of an aqueous mixture containing a water-soluble alginate salt and a gel-precipitant therefor, placing the gelled mold in an aqueous bath containing in solution a small quantity of dissolved material providing water-soluble accelerator for said setting-mineral material and water-soluble gel-precipitant for the water-soluble alginate salt, whereby the accelerator enters the mold to be retained thereby for delivery therefrom in forming the cast to be made, and whereby the gel-precipitant toughens and hardens the mold surface, removing the mold from the bath, and placing a hydraulic-setting mineral mix against the mold surface to form a cast, whereby accelerator in the mold speeds the setting of the cast, the quick-setting of the cast and the toughening and hardening of the mold providing a hard, smooth molded surface on the cast.

VANCE V. VALLANDIGHAM.